United States Patent
Shah

(10) Patent No.: US 7,386,605 B2
(45) Date of Patent: *Jun. 10, 2008

(54) METHODS AND APPARATUS FOR AUTOMATED EDGE DEVICE CONFIGURATION IN A HETEROGENEOUS NETWORK

(75) Inventor: Himanshu Shah, Framingham, MA (US)

(73) Assignee: Enterasys Networks, Inc., Andover, MA (US)

( * ) Notice: Subject to any disclaimer, the term of this patent is extended or adjusted under 35 U.S.C. 154(b) by 764 days.

This patent is subject to a terminal disclaimer.

(21) Appl. No.: 10/288,261

(22) Filed: Nov. 5, 2002

(65) Prior Publication Data

US 2004/0088389 A1    May 6, 2004

(51) Int. Cl.
G06F 15/16    (2006.01)
G06F 15/173    (2006.01)
H04J 3/16    (2006.01)
H04L 12/28    (2006.01)

(52) U.S. Cl. .................. 709/221; 709/232; 709/238; 370/401; 370/469

(58) Field of Classification Search .............. None
See application file for complete search history.

(56) References Cited

U.S. PATENT DOCUMENTS

| 5,309,437 | A | 5/1994 | Perlman et al. |
| 5,420,862 | A | 5/1995 | Perlman |
| 5,500,860 | A | 3/1996 | Perlman et al. |
| 5,796,740 | A | 8/1998 | Perlman et al. |
| 6,023,563 | A * | 2/2000 | Shani .................. 709/249 |
| 6,262,988 | B1 | 7/2001 | Vig |
| 6,490,292 | B1 | 12/2002 | Matsuzawa |
| 6,510,159 | B1 * | 1/2003 | Noriyuki ............. 370/401 |
| 6,625,658 | B1 | 9/2003 | Oguchi et al. |
| 6,721,353 | B1 * | 4/2004 | Taubert et al. .......... 375/220 |
| 6,747,979 | B1 * | 6/2004 | Banks et al. ........... 370/401 |
| 7,009,983 | B2 * | 3/2006 | Mancour .............. 370/401 |
| 2003/0108051 | A1 | 6/2003 | Bryden et al. |
| 2004/0202171 | A1 * | 10/2004 | Hama ................ 370/395.1 |

OTHER PUBLICATIONS

Himanshu Sha, ARP Mediation for IP interworking of Layer 2 VPN, Feb. 2002, pp. 1-20.
Himanshu Sha, ARP Mediation for IP interworking of Layer 2 VPN, Jun. 2002, pp. 1-19.

* cited by examiner

Primary Examiner—F. Zeender
Assistant Examiner—Ramsey Refai
(74) Attorney, Agent, or Firm—Lowrie, Lando & Anastasi, LLP

(57) ABSTRACT

A PE device learns the address of a local CE device by monitoring the control messages, such as address resolution messages, originating from those local devices. In one embodiment, automated configuration of the PE devices participating in a Layer 2 VPN is facilitated by permitting a PE device to share the addresses for its locally-attached CE devices with the remote PE devices in the VPN. A PE device may share the addresses of the remote CE devices with the local CE devices by initiating its own control message or responding to an control message issued by one of its local CE devices. This latter mechanism in effect hides the distributed, heterogeneous nature of the network from a local CE device.

30 Claims, 2 Drawing Sheets

METHODS AND APPARATUS FOR AUTOMATED EDGE DEVICE CONFIGURATION IN A HETEROGENEOUS NETWORK

The present application claims the benefit of U.S. application Ser. No. 10/288,243, now U.S. Pat. No. 7,009,983, by Timothy Mancour, filed Nov. 2, 2002, the entire disclosure of which is incorporated by reference as if set forth in its entirety herein.

FIELD OF THE INVENTION

The invention relates generally to the interworking of customer edge devices in a heterogeneous network and, in particular, to methods and apparatus that assist or automatically configure the provider edge devices in that network.

BACKGROUND OF THE INVENTION

One application for multi-protocol label switching (MPLS) is the implementation of Layer 2 virtual private networks (VPN) using MPLS tunneling. Referring to FIG. 1, a typical wide area network (WAN) includes customer edge (CE) devices 100, 104, 108, and 112, and provider edge (PE) devices 116, 120 and 124. In general, an edge device is a device, e.g., a router, that sits on the edge of a network cloud such as the Internet or a private network. The customer edge devices connect a customer to a provider network using a data link technology, such as frame relay, while the provider edge devices reside on the edge of the provider network and aggregate connections from the customer sites. In many traditional configurations, the CE "devices" 100, 104, 108, and 112 are actually groups of homogeneous CE devices—i.e., multiple CE devices that are connected to their PE device using the same data link or data link type—that share the same edge of their connected PE device.

Each CE device 100, 104, 108, and 112 communicates with its connected PE device 116, 120, and 124 using a data link 128, 132, 136, or 144. In the illustrated network, data link 128 is a gigabit Ethernet data link connecting CE device 100 to PE device 116, data link 144 is a gigabit Ethernet data link connecting CE device 112 to PE device 116, data link 132 is an ATM data link connecting CE device 104 to PE device 120, and data link 136 is a frame relay data link connecting CE device 108 to PE device 124. The WAN of FIG. 1 is a heterogeneous network in that the CE devices in the WAN communicate with their associated PE devices using different data link layer protocols.

Each CE device may be said to be "local" to the PE device it is attached to, and "remote" to the other PE devices in the WAN. For example, CE devices 100 and 112 are local to PE device 116 and remote to PE devices 120 and 124. Similarly, CE device 104 is local to PE device 120 and remote to PE devices 116 and 124.

The PE devices 116, 120, and 124 may communicate with each other through a network cloud 140 using various methods based on Border Gateway Protocol (BGP), Label Distribution Protocol (LDP), Layer 2 Tunneling Protocol (L2TP), etc. For example, using BGP through the cloud 140, the PE devices 116, 120, and 124 may exchange information that describes the blocks of Layer 2 virtual circuits connected to each PE device. After this exchange of information and/or through configuration, each PE device is aware of the CE devices that belong to its own virtual private network (VPN) and the identifiers for the data links that connect those CE devices.

In operation, for example, when CE device 100 transmits information to CE device 104 across their VPN, CE device 100 first transmits its frame of information to its connected PE device 116. The PE device 116 reads the Layer 2 header in the frame to identify the destination CE device 104. The PE device 116 removes the Layer 2 header from the frame and concatenates the raw IP packet with a VPN label that identifies the destination CE device 104 and its associated PE device, i.e., PE device 120. Then, the PE device 116 transmits the data using an MPLS tunnel through the network cloud 140 to the destination CE device's attached PE device 120. The PE device 120 receives this information and removes the VPN identifier from the packet. The PE device 120 prepends a Layer 2 header that identifies the destination CE device 104 to the packet before transmitting it to the destination CE device 104 over the data link 132.

This MPLS-based Layer 2 VPN is scalable, in that a new CE device may be added to the WAN by physically connecting the CE device to an existing PE device, and then manually reconfiguring the PE device. However, it fails to provide a mechanism whereby the PE device would automatically configure itself and its peer PE devices to add the new CE device to the network. Such a mechanism is desirable in that it reduces the amount of human intervention required to add a new CE device to the network. Moreover, this VPN does not provide a mechanism for satisfying control messages, such as address resolution messages (e.g., an ARP request), sent from one CE device using one type of data link (e.g., a frame relay link) that is attempting to discover the address of a second CE device across the VPN that uses a different type of data link (e.g., an ATM link).

SUMMARY OF THE INVENTION

The present invention relates to methods and apparatus that permit a PE device to learn the address of a local CE device by monitoring the control messages, such as address resolution messages, originating from those local CE devices. In one embodiment, the invention facilitates the automated configuration of the PE devices participating in a Layer 2 VPN by permitting a PE device to share the addresses for its locally-attached CE devices with the remote PE devices in the VPN. In accordance with this embodiment, a PE device may share the addresses of the remote CE devices with the local CE devices by initiating its own control messages or responding to a control message issued by one of its local CE devices. This latter mechanism in effect hides the distributed, heterogeneous nature of the network from a local CE device.

In one aspect, therefore, the present invention provides a method of resolving network addresses between network devices on a heterogeneous network in a device bridging data link layer protocols and network layer protocols. Information concerning a first device in communication with a first data link is gathered from a control message, such as an address resolution message. Packets are received from a second device in communication with a second data link, the first and second data links utilizing different data link layer protocols. The gathered information is provided to a third device in communication with the second device through the second data link, e.g., by transmitting an MP-BGP NLRI message to the third device. The packets are transmitted to the first device using the gathered information concerning the first device. The step of transmitting the packets may include prepending a header identifying the second device to a received packet. Optionally, information may be received from the third device concerning a fourth device and this received information may be provided to the first device, for example, by responding to a control message or initiating a control message.

The gathered information may be the first device's IP address, circuit information, a VC or VPN MPLS label, or the IP address for the second device associated with that label. The data links may utilize, for example, gigabit Ethernet, frame relay, point-to-point protocol (PPP), asynchronous transfer mode (ATM), or high-level data link control protocol (HDLC). Accordingly, depending on the type of data link, the control message may be, respectively, an RDP message, an IARP message, an IPCP message, or an INATMARP message. In one embodiment, message responses may be generated using a placeholder value. In another embodiment, the NLRI message includes an IP address sub-TLV.

In another aspect, the present invention provides a system that resolves network addresses between network devices on a heterogeneous network. The system includes a first device bridging data link layer protocols and network layer protocols and a second device in communication with the first device using a first data link. A third device bridging data link layer protocols and network layer protocols is in communication with a fourth device using a second data link. The second data link uses a different data link layer protocol from the first data link.

The first device gathers information concerning the second device from control messages—such as address resolution messages—sent by the second device and provides the gathered information to the third device. The third device may utilize the information from the first device to route packets from the fourth device to the second device. Suitable data links include gigabit Ethernet data links, frame relay data links, PPP data links, ATM data links, and HDLC data links.

The foregoing and other features and advantages of the present invention will be made more apparent from the description, drawings, and claims that follow.

BRIEF DESCRIPTION OF THE DRAWINGS

The advantages of the invention may be better understood by referring to the following description taken in conjunction with the accompanying drawings in which.

In the drawings, like reference characters generally refer to corresponding parts throughout the different views. The drawings are not necessarily to scale, emphasis instead being placed on the principles and concepts of the invention.

DETAILED DESCRIPTION OF THE INVENTION

In brief overview, the present invention permits a PE device in a heterogeneous network to learn the address information for its locally-connected CE devices by monitoring the control messages sent by the CE devices. In one embodiment, the PE device then shares this learned address information with other PE devices. These remote PE devices may then provide their own locally-connected CE devices with the shared address information they have received. Using this information, the PE devices transparently route communications between CE devices that are connected to their PE devices using different types of data links.

Figure 1:
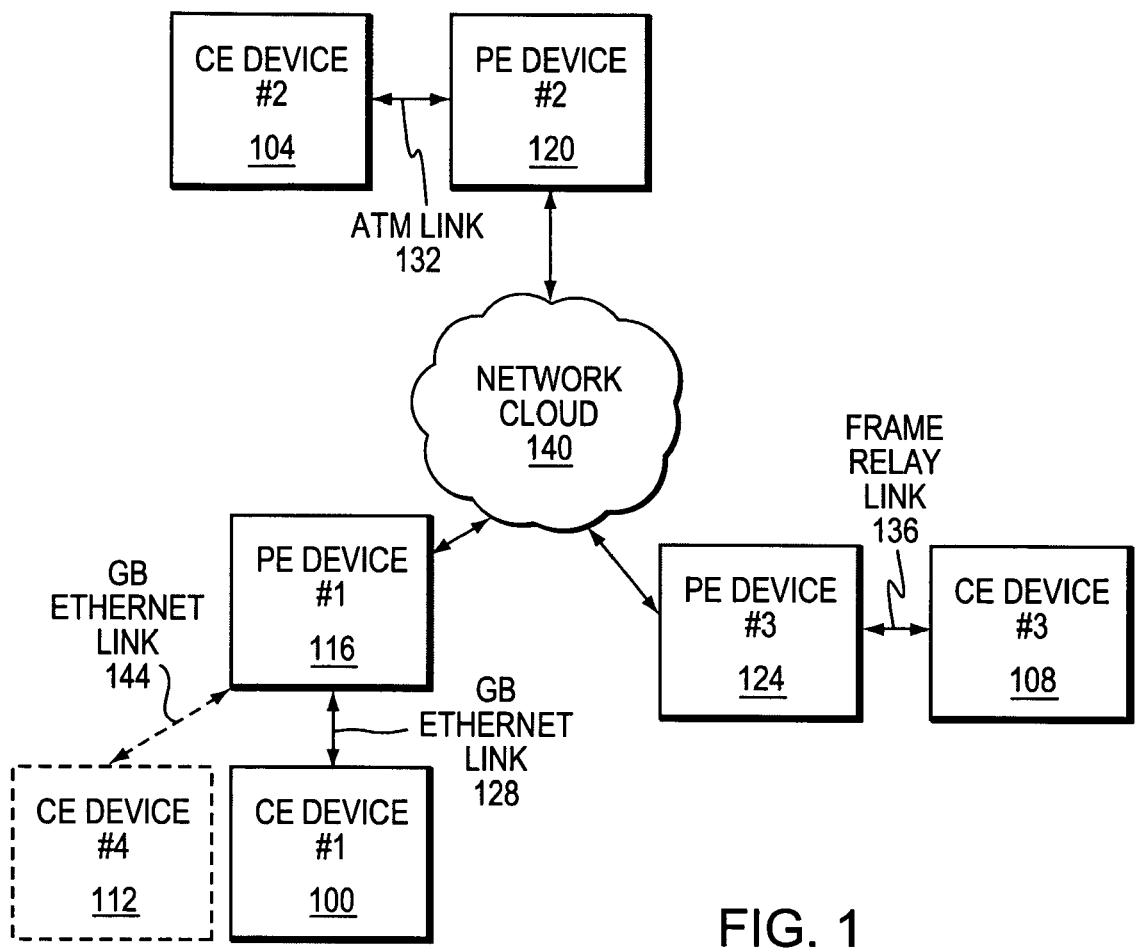
FIG. 1 depicts a WAN having CE devices connected locally to their respective PE devices and remotely to other PE devices through a network cloud.
Figure 2:
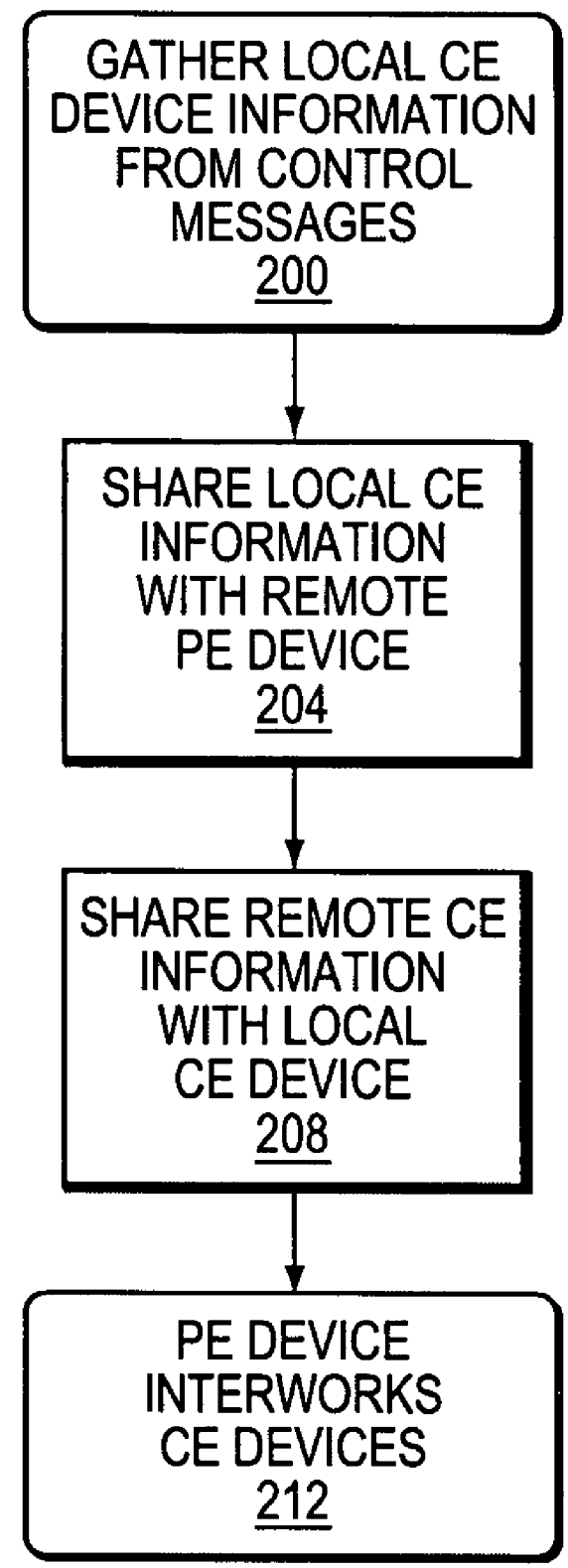
FIG. 2 is a flowchart illustrating one embodiment of a method for the automatic configuration of the PE devices of FIG. 1.

As discussed above, one or more PE devices 116, 120, and 124 in the heterogeneous WAN of FIG. 1 participate in IP interworking by changing the Layer 2 encapsulation of the IP protocol data units (PDUs) flowing to and from the CE devices that are local to it. Referring to FIG. 2, the PE devices gather information concerning their locally-connected CE devices by monitoring the control messages sent by the CE devices (Step 200). Once this information is gathered, each PE device may share the information concerning its locally-connected CE devices with the other PE devices in the network using a PE protocol such as BGP, LDP, L2TP, etc. (Step 204). With the receipt of this shared information, a PE device in the VPN has address information concerning both its own locally-connected CE devices and those CE devices that are remote to it, but local to another PE device in the VPN. The PE device may now share the information concerning the remote CE devices with its locally-connected CE devices, either directly or indirectly (Step 208). Using the exchanged address information, the PE device may now participate in interworking as described above (Step 212).

In one embodiment, the control messages from the local CE devices (Step 200) are address resolution messages, as discussed in detail below. The information gathered from the control messages may include, but is not limited to, one or more of a local CE device's IP address, circuit information, a virtual channel (VC) or VPN MPLS label, or the IP address for the remote CE associated with that label. Once gathered, this information may be stored as a tuple or other data structure in a volatile memory, such as a random-access memory (RAM), and/or a nonvolatile memory, such as a hard disk. In a Layer 2 interworking VPN there is typically one tuple for each circuit that the CE device has attached to its local PE device. Although the process for gathering information (Step 200) varies among the various types of data links connecting CE devices to their local PE devices, it typically includes the receipt of a control message from a local CE device, the extraction of information concerning the local CE device from the control message and, optionally, the storage of this information in a volatile or a non-volatile memory.

Gathering Local CE Device Information

When the data link is a gigabit Ethernet data link, e.g., data link 128, the PE device may learn the address of a local CE device (Step 200) on a given Ethernet circuit using router discovery protocol (RDP), as set forth in IETF RFC 1256 and incorporated by reference as if set forth fully herein. If the PE device is connected to the local CE device using gigabit Ethernet with virtual local-area network (VLAN) tagging (as described in IEEE standard 802.1Q and incorporated by reference as if set forth fully herein), then the VLAN tag may represent an IP subnet and the circuit information will then consist of Ethernet interface information and the VLAN tag. If the PE device does not use IEEE 802.1Q VLAN tagging, then the entire Ethernet port is treated as a single endpoint that is connected to one remote endpoint through a pair of PE devices, the Ethernet interface is the IP subnet, and the circuit information only includes Ethernet interface information. Regardless of whether the PE device supports IEEE 802.1Q tagging, only one CE device—in this case the Ethernet router end station—is presumed to participate within the IP interworking-based Layer 2 VPN.

When the data link is a frame relay data link, e.g., data link 136, a newly-attached CE device may generate an inverse address resolution protocol (IARP) request—defined in IETF RFC 2390 and incorporated by reference as if set forth in its entirety herein—to obtain the IP addresses of its neighboring devices when the data link connection identifier (DLCI) associated with the IP interface becomes active. Typically, the DLCI will become active when the local PE device has learned cross-connect-related information from a remote PE device using BGP, presenting a stalemate problem that may be resolved as discussed below. Once the local CE device issues the IARP request, the attached PE device may determine the local CE device's IP address and DLCI information from the IARP request (Step 200).

When the data link uses point-to-point protocol (PPP), then the attached CE device participates in internet protocol control protocol (IPCP, defined in IETF RFC 1332 and incorporated by reference as if set forth in its entirety herein) to obtain the IP addresses for its neighbor devices. By examining the local CE device's IPCP request, the PE device may determine the CE device's IP address (Step 200).

When the data link is an asynchronous transfer mode (ATM) link, an attached CE device treats each virtual circuit (VC) as an IP subnet. The attached CE device may participate in inverse ATM ARP (INATMARP, defined in IETF RFC 1577 and incorporated by reference as if set forth in its entirety herein) to obtain the IP addresses for its neighbor devices. The PE device may learn the local CE device's IP address from the local CE device's INATMARP request (Step 200).

The high-level data link control protocol (HDLC, described in ISO Standard 3309 and incorporated by reference as if set forth in its entirety herein) does not specify a protocol mechanism for obtaining the IP address of a neighboring device. Instead, a device using HDLC receives IP data frames from a single remote endpoint and, therefore, implicitly assumes the presence of a single IP address. Therefore, when the data link connecting the PE device to its local CE device is an HDLC data link, the PE device is manually configured with the IP address of the local CE device to permit the local PE device to distribute cross-connect information to remote PE devices (Step 200).

Sharing Remote CE Device Information with Remote PE Device

Having gathered information from the control messages, such as address resolution messages, sent by the local CE devices (Step 200), a PE device may now share information concerning its local CE devices with another PE device (Step 204). These cross-connect advertisements may include, for example, one or more of the local CE device's IP address, circuit information, a virtual channel (VC) or VPN MPLS label, or the IP address for the remote CE associated with that label. In various embodiments of the invention, the PE devices may communicate using Border Gateway Protocol (BGP), Label Distribution Protocol (LDP), Layer 2 Tunneling Protocol (L2TP), etc.

In one embodiment, the information may be sent to a PE device at the edge of the network cloud using multiprotocol BGP (MP-BGP) network layer reachability information (NLRI) messages. A typical NLRI message includes a label block offset, a label base, and a length of the circuit status vector sub-TLV. The NLRI messages sent to the remote PE device provide a set of contiguous labels starting from the label base value that correspond to a set of remote CE identifiers starting from the label block offset.

In accord with the present invention, the NLRI message may also include a second sub-TLV of type TBD that contains an IP address. A PE device advertises this new IP address sub-TLV when the VPN's encapsulation type is IP interworking. This second sub-TLV has the same length as the circuit status vector sub-TLV. The length field of the sub-TLV specifies the number of 4-byte fields contained in the value field of the IP address sub-TLV, where each field is an IP address that has a one-to-one correspondence with the labels represented by the label base and length field. By iterating through each IP field value in order, a receiving PE device may determine the association between a label and an IP address.

Sharing Remote CE Device Information with Local CE Device

Once a PE device has received these cross-connect advertisements, e.g., an IP address-to-label association, the PE device may provide this information to its local CE devices (Step 208). Although the process for sharing the information (Step 208) varies depending on the type of data link between the local CE devices and their PE devices, the process is typically either active, e.g., the PE device transmits an control message to its local CE devices, or passive, e.g., the PE device responds to its local CE device's control message with the remote CE device's address information.

When the data link is a gigabit Ethernet data link, the PE device may generate an address resolution protocol request (ARP, defined in IETF RFC 826 and incorporated by reference as if set forth in its entirety herein) to present the IP address of the remote CE device as a neighbor to the local CE device (Step 208). If the PE device supports IEEE 802.1Q tagging, then the request must be generated within the VLAN scope. The PE device may also respond to the local CE device's ARP request with its own MAC address as the target hardware address when the WAN IP address of the cross-connected remote CE device is known (Step 208). To make communications with the remote CE device transparent, the local PE device may optionally provide its MAC address in the source hardware address field of the ARP request and the target hardware address field of the ARP reply. If two CE devices are locally attached to their PE device on gigabit Ethernet data links, then the local PE device may propagate an ARP request or an ARP response with VLAN tag translation directly to the second CE device.

When the data link is a frame relay data link and the PE device has received cross-connect information from a remote PE device, then the corresponding DLCI at the local PE device is inactive. The local PE device may initiate an IARP request providing the address information for the cross-connected remote CE device, or it may wait for the attached CE device to generate an IARP request and then respond with the address information (Step 208).

When the data link uses PPP, the PE device may respond to IPCP requests from its local CE devices with the IP address information for the remote CE devices when that information becomes available (Step 208). If the IP address information and the cross-connect information are available, the PE device may also initiate an IPCP request to provide the local CE device with address information for the cross-connected remote CE devices (Step 208).

When the data link is an ATM data link, the PE device may generate an INATMARP message for its local CE devices when the address information for the remote cross-connected CE devices becomes available. If the local PE device has received the cross-connect information and the associated IP address information from a remote PE device, then the local PE device may optionally respond to an INATMARP request received from its local CE devices (Step 208).

As discussed above, the address information for a remote CE device may not be available to a particular PE device when that PE device receives a control message, such as an address resolution message, from its local CE device. In that event, if the remote CE device's information is not available, then the PE device may advertise the cross-connect information to its local CE devices without the remote CE device's address by using a dummy value (such as zero) in the new IP address sub-TLV (Step 208). When the address information for the remote CE device becomes available, the PE device may generate a new advertisement to its local CE devices with an updated IP address field value (Step 208). This behavior prevents a stalemate situation, e.g., in a frame relay data link, where the local CE device will not transmit a control message that will eventually be conveyed as cross-connect information until its attached PE device signals its readiness, and the attached PE device will not signal its readiness until it receives cross-connect information that originates with a remote CE device that is waiting for its own PE device to signal its readiness.

Many alterations and modifications may be made without departing from the spirit and scope of the invention. Therefore, it is to be understood that these embodiments have been shown by way of example and should not be taken as limiting the invention, which is defined by the following claims. These claims are thus to be read as not only including literally what is set forth by the claims but also to include those equivalents which are insubstantially different, even though not identical in other respects to what is shown and described in the above illustrations.

What is claimed is:

1. In a network device having memory and capable of forwarding data link layer protocols and network layer protocols, a method of transmitting packets, the method comprising:
   gathering information from a control message concerning a first device in communication with a first data link;
   storing the gathered information in a set of network information, the set of network information being stored in the memory;
   terminating the control message at the network device;
   responding to the control message using a subset of the set of network information;
   providing a subset of the set of network information to a second device in communication with a second data link, the first and second data links using different data link layer protocols;
   receiving, from the second device, information concerning a third device, the third device in communication with the second device through the second data link;
   storing the received information in the set of network information;
   providing, to the first device, network information representing the third device using a subset of the set of network information prior to receiving a request for the received information from the first device;
   receiving packets from the second device; and
   transmitting the packets to the first device using a subset of the set of network information.

2. The method of claim 1 wherein gathering information comprises gathering information from an address resolution message.

3. The method of claim 1 wherein gathering information comprises gathering at least one of the first device's IP address, circuit information, a VC or VPN MPLS label, or the IP address for the second device associated with that label.

4. The method of claim 1 wherein gathering information comprises gathering information concerning a first device in communication with an Ethernet data link.

5. The method of claim 4 wherein gathering information comprises gathering information from an RDP message.

6. The method of claim 1 wherein gathering information comprises gathering information concerning a first device in communication with a frame relay data link.

7. The method of claim 6 wherein gathering information comprises gathering information from an IARP message.

8. The method of claim 1 wherein gathering information comprises gathering information concerning a first device in communication with PPP data link.

9. The method of claim 8 wherein gathering information comprises gathering information from an IPCP message.

10. The method of claim 1 wherein gathering information comprises gathering information concerning a first device in communication with an ATM data link.

11. The method of claim 10 wherein gathering information comprises gathering information from an INATMARP message.

12. The method of claim 1 wherein gathering information comprises gathering information concerning a first device in communication with an HDLC data link.

13. The method of claim 1 wherein transmitting the packets comprises prepending a header identifying the second device to a received packet.

14. The method of claim 1 wherein providing the gathered information comprises transmitting an MP-BGP NLRI message to the third device.

15. The method of claim 14 wherein transmitting an MP-BGP NLRI message comprises transmitting an NLRI message including an IP address sub-TLV.

16. The method of claim 1 further comprising:
    receiving additional information from the second device, the additional information concerning a fourth device; and
    providing the additional information concerning the fourth device to the first device.

17. The method of claim 16 wherein providing the additional information comprises responding to the control message.

18. The method of claim 16 wherein providing the additional information comprises initiating a second control message.

19. The method of claim 1 further comprising responding to the control message using a placeholder value.

20. The method of claim 1, wherein transmitting the packets comprises transmitting packets that originate from the third device.

21. A system that resolves network addresses between network devices on a heterogeneous network, the system comprising:
    a first device having memory and capable of forwarding data link layer protocols and network layer protocols;
    a second device in communication with the first device using a first data link;
    a third device capable of forwarding data link layer protocols and network layer protocols; and
    a fourth device in communication with the third device using a second data link, the first and second data links using different data link layer protocols;
    wherein the first device gathers information concerning the second device from control messages sent by the second device, the first device is adapted to store the gathered information in a set of network information, the set of network information being stored in the memory, the first device is adapted to provide a subset of the set of network information to the third device, the first device is adapted to receive, from the third device, information concerning the fourth device, the first device is adapted to store the received information in the set of network information, the first device is adapted to provide network information representing the fourth device to the second device prior to receiving a request for the received information from the second device, the network information being based on a subset of the set of network information, the first device is adapted to transmit packets to the second device from the fourth device using a subset of the set of network information, the first device is adapted to terminate the control messages and the first device is adapted to respond to the control messages using a subset of the set of network information.

22. The system of claim 21 wherein the control messages are address resolution messages.

23. The system of claim 21 wherein the first data link is a Ethernet data link.

24. The system of claim 21 wherein the first data link is a frame relay data link.

25. The system of claim 21 wherein the first data link is a PPP data link.

26. The system of claim 21 wherein the first data link is an ATM data link.

27. The system of claim 21 wherein the first data link is an HDLC data link.

28. The system of claim 21 wherein the first device provides the gathered information to the third device.

29. The system of claim 28 wherein the third device utilizes the information from the first device to route packets from the fourth device to the second device.

30. The system of claim 21, wherein the first and third devices are interconnected through at least one Virtual Private Network.

* * * * *

UNITED STATES PATENT AND TRADEMARK OFFICE
CERTIFICATE OF CORRECTION

PATENT NO.        : 7,386,605 B2
APPLICATION NO. : 10/288261
DATED              : June 10, 2008
INVENTOR(S)      : Himanshu Shah It is certified that error appears in the above-identified patent and that said Letters Patent is hereby corrected as shown below:

Column 1, lines 6-10 cancel the text "The present application claims the benefit of U.S. application Ser. No. 10/288,243, now U.S. Pat. No. 7,009,983, by Timothy Mancour, filed Nov. 2, 2002, the entire disclosure of which is incorporated by reference as if set forth in its entirety herein." and insert the following language:

--The present application incorporates U.S. application Ser. No. 10/288,243, now U.S. Pat. No. 7,009,983, by Timothy Mancour, filed Nov. 5, 2002, herein by reference in its entirety.--

Signed and Sealed this

Seventeenth Day of March, 2009

JOHN DOLL
*Acting Director of the United States Patent and Trademark Office*